United States Patent
Moribe

(10) Patent No.: US 12,367,351 B2
(45) Date of Patent: Jul. 22, 2025

(54) CONVERSION TABLE GENERATION DEVICE, CONVERSION TABLE GENERATION METHOD, AND RECORDING MEDIUM FOR DECISION MAKING SUPPORT

(71) Applicant: NEC Corporation, Tokyo (JP)

(72) Inventor: Shoujirou Moribe, Tokyo (JP)

(73) Assignee: NEC Corporation, Tokyo (JP)

( * ) Notice: Subject to any disclaimer, the term of this patent is extended or adjusted under 35 U.S.C. 154(b) by 421 days.

(21) Appl. No.: 17/784,843

(22) PCT Filed: Dec. 25, 2019

(86) PCT No.: PCT/JP2019/050798
§ 371 (c)(1),
(2) Date: Jun. 13, 2022

(87) PCT Pub. No.: WO2021/130892
PCT Pub. Date: Jul. 1, 2021

(65) Prior Publication Data
US 2023/0004726 A1    Jan. 5, 2023

(51) Int. Cl.
*G10L 15/22* (2006.01)
*G06F 40/279* (2020.01)
(Continued)

(52) U.S. Cl.
CPC ............ *G06F 40/35* (2020.01); *G06F 40/279* (2020.01)

(58) Field of Classification Search
CPC ... G10L 15/22; G10L 15/26; G10L 2015/088; G10L 2015/223; G10L 15/20;
(Continued)

(56) References Cited

U.S. PATENT DOCUMENTS 6,314,397 B1 * 11/2001 Lewis ................... G10L 15/26
                                                              704/235
7,181,387 B2 * 2/2007 Ju ......................... G10L 15/06
                                                              704/E15.02
(Continued)

FOREIGN PATENT DOCUMENTS

JP    H04-081898 A    3/1992
JP    H09-244692 A    9/1997
(Continued)

OTHER PUBLICATIONS

International Search Report for PCT Application No. PCT/JP2019/050798, mailed on Mar. 17, 2020.
(Continued)

*Primary Examiner* — Olujimi A Adesanya
(74) *Attorney, Agent, or Firm* — Michael Dryja

(57) ABSTRACT

A conversion table generation device includes a similar word extraction unit and a conversion table generation unit. The similar word extraction unit is configured to extract similar words similar to first words, for each of the first words included in a word group used in a dialogue. The conversion table generation unit is configured to associate any one of the first words with the extracted similar words, that are similar to the plurality of first words, as second words, on the basis of the priority, and generates a conversion table for voice recognition with the second word as a conversion source and the first word as a conversion destination.

9 Claims, 16 Drawing Sheets

| CONVERSION DESTINATION | SIMILAR WORD 1 | SIMILAR WORD 2 | SIMILAR WORD 3 | SIMILAR WORD 4 | SIMILAR WORD 5 |
|---|---|---|---|---|---|
| RESERVATION (YOYAKU) | MEDICATION (YOYAKU) | SUMMARY (YOUYAKU) | FREE TRANSLATION (IYAKU) | CHILD ACTOR (KOYAKU) | ... |
| RULE (KIYAKU) | FREE TRANSLATION (IYAKU) | MEDICINE (IYAKU) | LEAPING (HIYAKU) | LEAPING (HIYAKU) | CHILD ACTOR (KOYAKU) |
| FIVE PERSONS (GONIN) | MISRECOGNITION (GONIN) | | | | |

(51) Int. Cl.
  *G06F 40/35* (2020.01)
  *G10L 15/26* (2006.01)
  *G10L 15/28* (2013.01)

(58) Field of Classification Search
  CPC ....... G10L 15/24; G06F 40/284; G06F 40/30; G06F 40/10; G06F 40/237; G06F 40/268; G06F 40/279; G06F 40/20
  See application file for complete search history.

(56) References Cited

U.S. PATENT DOCUMENTS

| | | | | |
|---|---|---|---|---|
| 7,974,844 B2* | 7/2011 | Sumita | ................ | G10L 15/1815 704/4 |
| 2003/0144846 A1* | 7/2003 | Denenberg | .............. | G10L 15/22 704/E15.044 |
| 2005/0159960 A1* | 7/2005 | Schmid | .................. | G10L 15/26 704/277 |
| 2007/0179784 A1* | 8/2007 | Thambiratnam | ....... | G10L 15/26 704/E15.045 |
| 2015/0106091 A1* | 4/2015 | Wetjen | .................... | G10L 15/26 704/235 |
| 2015/0371627 A1* | 12/2015 | Lee | ......................... | G10L 15/22 704/235 |
| 2017/0031896 A1* | 2/2017 | Dymetman | ............. | G06F 40/30 |
| 2019/0147036 A1* | 5/2019 | Fuoco | .................... | G10L 15/02 704/9 |
| 2020/0175961 A1* | 6/2020 | Thomson | ................ | G10L 15/28 |
| 2024/0265041 A1* | 8/2024 | Rennie | .................... | G06F 16/93 |

FOREIGN PATENT DOCUMENTS

| | | |
|---|---|---|
| JP | 2010-097411 A | 4/2010 |
| JP | 2010-197411 A | 9/2010 |
| JP | 2018-004976 A | 1/2018 |
| JP | 2018-45001 A | 3/2018 |
| JP | 2018-072678 A | 5/2018 |

OTHER PUBLICATIONS

English translation of Written opinion for PCT Application No. PCT/JP2019/050798, mailed on Mar. 17, 2020.

JP Office Action for JP Application No. 2021-566631, mailed on Jul. 11, 2023 with English Translation.

* cited by examiner

Fig.3

| CONVERSION DESTINATION | CONVERSION SOURCE 1 | CONVERSION SOURCE 2 | CONVERSION SOURCE 3 | CONVERSION SOURCE 4 | CONVERSION SOURCE 5 |
|---|---|---|---|---|---|
| RESERVATION (YOYAKU) | MEDICATION (YOYAKU) | SUMMARY (YOUYAKU) | | | |
| RULE (KIYAKU) | FREE TRANSLATION (IYAKU) | MEDICINE (IYAKU) | LEAPING (HIYAKU) | REAGENT (SHIYAKU) | CHILD ACTOR (KOYAKU) |
| FIVE PERSONS (GONIN) | MISRECOGNITION (GONIN) | | | | |

Fig.6

[WORDS AND SENTENCE USED IN CONVERSATION]
- RESERVATION, CHANGE, CANCEL, RULE, CONFIRMATION, REFERENCE
- [NUMBER] PERSONS. [NUMBER] PEOPLE. [1-12] MONTH [1-31] DAY
- TENNIS. BASEBALL, TABLE TENNIS, VOLLEYBALL
- I WANT TO MAKE A RESERVATION

Fig.8

| CONVERSION DESTINATION | SIMILAR WORD 1 | SIMILAR WORD 2 | SIMILAR WORD 3 | SIMILAR WORD 4 | SIMILAR WORD 5 |
|---|---|---|---|---|---|
| RESERVATION (YOYAKU) | MEDICATION (YOYAKU) | SUMMARY (YOUYAKU) | FREE TRANSLATION (IYAKU) | CHILD ACTOR (KOYAKU) | ... |
| RULE (KIYAKU) | FREE TRANSLATION (IYAKU) | MEDICINE (IYAKU) | LEAPING (HIYAKU) | LEAPING (HIYAKU) | CHILD ACTOR (KOYAKU) |
| FIVE PERSONS (GONIN) | MISRECOGNITION (GONIN) | | | | |

Fig.9

| N-ROW | WA-ROW | RA-ROW | YA-ROW | MA-ROW | HA-ROW | NA-ROW | TA-ROW | SA-ROW | KA-ROW | A-ROW | |
|---|---|---|---|---|---|---|---|---|---|---|---|
| N | WA | RA | YA | MA | HA | NA | TA | SA | KA | A | A-GROUP |
| | | RI | | MI | HI | NI | CHI | SHI | KI | I | I-GROUP |
| | | RU | YU | MU | HU | NU | TSU | SU | KU | U | U-GROUP |
| | | RE | | ME | HE | NE | TE | SE | KE | E | E-GROUP |
| | | RO | YO | MO | HO | NO | TO | SO | KO | O | O-GROUP |

SIMILAR-SOUNDING WORD CANDIDATE OF "OYAKU" "YOYAKU" (USEFUL)

SIMILAR-SOUNDING WORD CANDIDATE OF "KIYAKU" "IYAKU" (FREE TRANSLATION, MEDICINE) "HIYAKU" (LEAPING, SECRET MEDICINE) "SHIYAKU" (REAGENT)

OVERLAPPED PORTION AND PORTION NOT OVERLAPPED ON BOTH SIDES ARE CLOSE TO WORD HAVING HIGH PRIORITY "KOYAKU" (CHILD ACTOR)

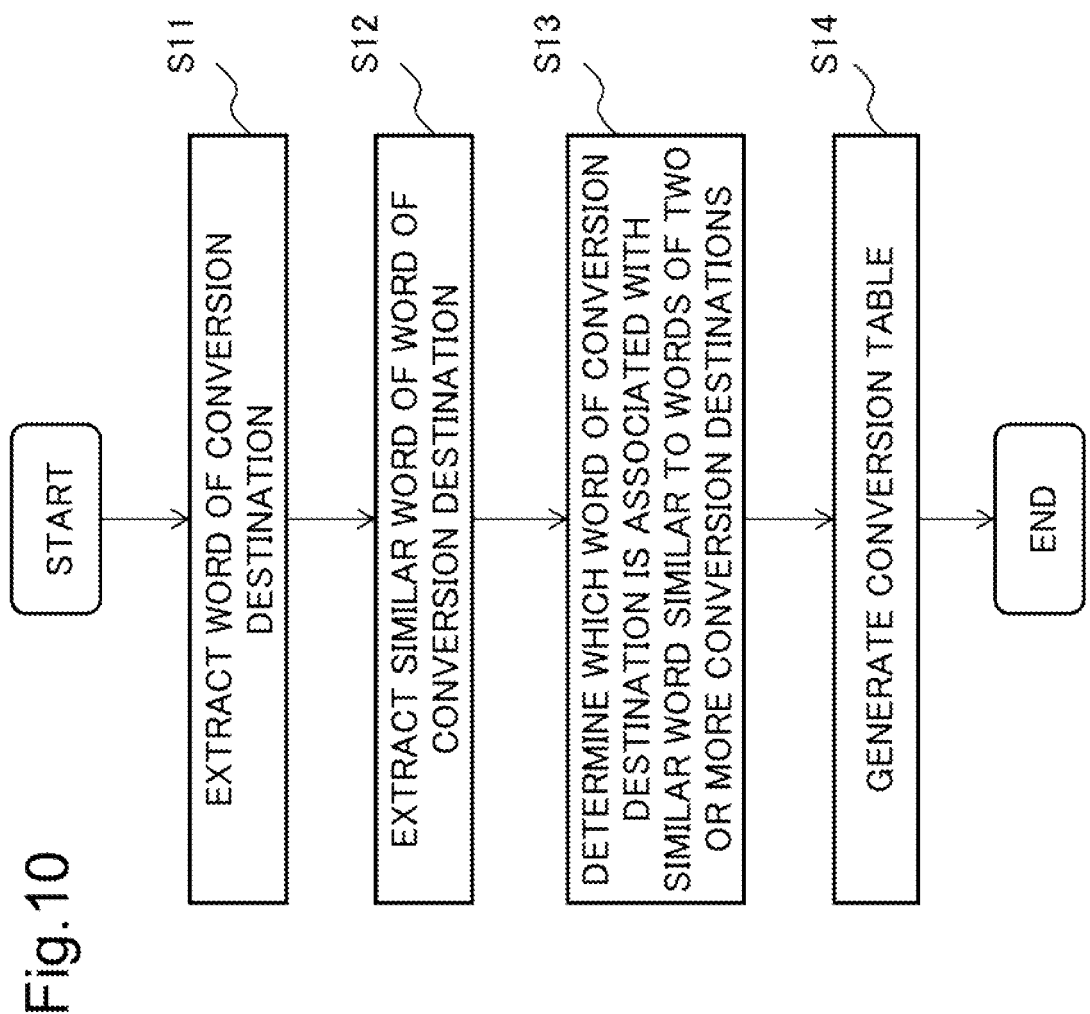

CONVERSION TABLE GENERATION DEVICE, CONVERSION TABLE GENERATION METHOD, AND RECORDING MEDIUM FOR DECISION MAKING SUPPORT This application is a National Stage Entry of PCT/JP2019/050798 filed on Dec. 25, 2019, the contents of all of which are incorporated herein by reference, in their entirety.

TECHNICAL FIELD

The present invention relates to a voice dialogue technology, and particularly relates to a technology for correcting a voice recognition result.

BACKGROUND ART

Voice dialogue systems that automatically respond to users are widely used in reservation systems, contact centers, and the like. The voice dialogue system recognizes the voice of the user, converts the voice into a sentence, and generates a sentence corresponding to the content of the utterance of the user by a voice dialogue control device also called a chatbot, thereby establishing a conversation. Therefore, it is important to accurately recognize the utterance of the user in order to improve the accuracy of the response.

In voice recognition, it is difficult to correctly recognize homonyms and similar-sounding words. When the accuracy of voice recognition is improved for a word that is difficult to recognize as described above, a method is used in which a sequence of words appearing in one sentence is learned as statistical information and is estimated from preceding and following words. However, the user's answer is often made in a short sentence, and it is difficult to improve accuracy by estimating from preceding and subsequent sentences. Therefore, it is desirable to have a technique for improving the recognition accuracy of homonyms and similar-sounding words even for short utterances. As a technique for improving the accuracy of such voice recognition of homonyms and similar-sounding words, for example, a technique as disclosed in PTL 1 is disclosed.

PTL 1 relates to a voice recognition system that corrects a character erroneously recognized by voice recognition. The voice recognition system of PTL 1 has a conversion data table in which a false recognition word candidate is associated with a candidate of a word of the conversion destination of the false recognition word candidate. The false recognition word candidate refers to a word that is erroneously recognized when the word of the conversion destination should be recognized. The voice recognition system of PTL 1 converts a false recognition word candidate into a word of the conversion destination when the false recognition word candidate is detected. PTL 1 describes that when a false recognition word candidate is detected, the false recognition can be reduced by converting the candidate into a word of the conversion destination.

CITATION LIST

Patent Literature

[PTL 1] JP 2018-45001 A

SUMMARY OF INVENTION

Technical Problem

However, the technique of PTL 1 is not sufficient in the following points. In PTL 1, the voice recognition result is corrected by replacing words on the basis of the conversion data table. In PTL 1, when the conversion data table used to correct a voice recognition result is generated, it is necessary for an operator to set in advance conversion data in which a false recognition word candidate and a candidate of a word of the conversion destination of the false recognition word candidate are associated with each other. However, for each word that may be used in the voice recognition system, it is difficult for an operator to estimate a word that is unlikely to be erroneously converted to generate a conversion table, and the workload required to create a highly reliable conversion data table can be enormous. Therefore, the technique of PTL 1 is not sufficient as a technique for correcting a voice recognition result in order to improve the accuracy of voice recognition.

In order to solve the above problems, an object of the present invention is to provide a conversion table generation device, a voice dialogue system, a conversion table generation method, a voice dialogue method, and a recording medium capable of suppressing a workload necessary for generating a conversion table used when correcting a voice recognition result.

Solution to Problem

In order to solve the above problem, a conversion table generation device of the present invention includes a similar word extraction unit and a conversion table generation unit. The similar word extraction unit extracts similar words similar to first words, each of the first words is included in a word group used in a dialogue. The conversion table generation unit associates a similar word, as a second word, similar to the plurality of first words among the extracted similar words with any one of the first words on the basis of the priority, and generates a conversion table for voice recognition with the second word as a conversion source and the first word as a conversion destination.

The conversion table generation method of the present example embodiment extracts a similar word similar to the first word for each of the first words included in the word group used in the dialogue. The conversion table generation method of the present example embodiment associates a similar word, as a second word, similar to the plurality of first words among the extracted similar words with any one of the first words on the basis of the priority, and generates a conversion table for voice recognition with the second word as a conversion source and the first word as a conversion destination.

The voice dialogue method of the present example embodiment extracts a similar word similar to the first word for each of the first words included in the word group used in the dialogue. The voice dialogue method of the present example embodiment associates a similar word, as a second word, similar to the plurality of first words among the extracted similar words with any one of the first words on the basis of the priority, and generates a conversion table with the second word as a conversion source and the first word as a conversion destination. The voice dialogue method of the present example embodiment converts input voice data into a sentence by voice recognition, and replaces the second word with the first word based on the conversion table when the second word included in the conversion table is detected from the sentence converted from the voice data. The voice dialogue method of the present example embodiment generates a sentence for responding to a sentence in which the second word is replaced with the first word.

The recording medium of the present example embodiment records a computer program for causing a computer to execute processing. The computer program causes the computer to execute processing of extracting a similar word similar to the first word for each of the first words included in the word group used in the dialogue. The computer program causes the computer to associate a similar word, as a second word, similar to the plurality of first words among the extracted similar words with any one of the first words on the basis of the priority, and generate a conversion table for voice recognition with the second word as a conversion source and the first word as a conversion destination.

Advantageous Effects of Invention

It is possible to suppress the workload required for generating the conversion table used when correcting the voice recognition result.

BRIEF DESCRIPTION OF DRAWINGS

FIG. 3 is a diagram illustrating an example of a conversion table according to the first example embodiment of the present invention.

FIG. 6 is a diagram illustrating an example of words of a conversion destination according to the first example embodiment of the present invention.

FIG. 8 is a diagram illustrating an example of a similar word extracted in the first example embodiment of the present invention.

FIG. 9 is a diagram illustrating a criterion for generating the conversion table in the first example embodiment of the present invention.

FIG. 10 is a diagram illustrating an operation flow of the conversion table generation device according to the first example embodiment of the present invention.

EXAMPLE EMBODIMENT

First Example Embodiment

Figure 1:
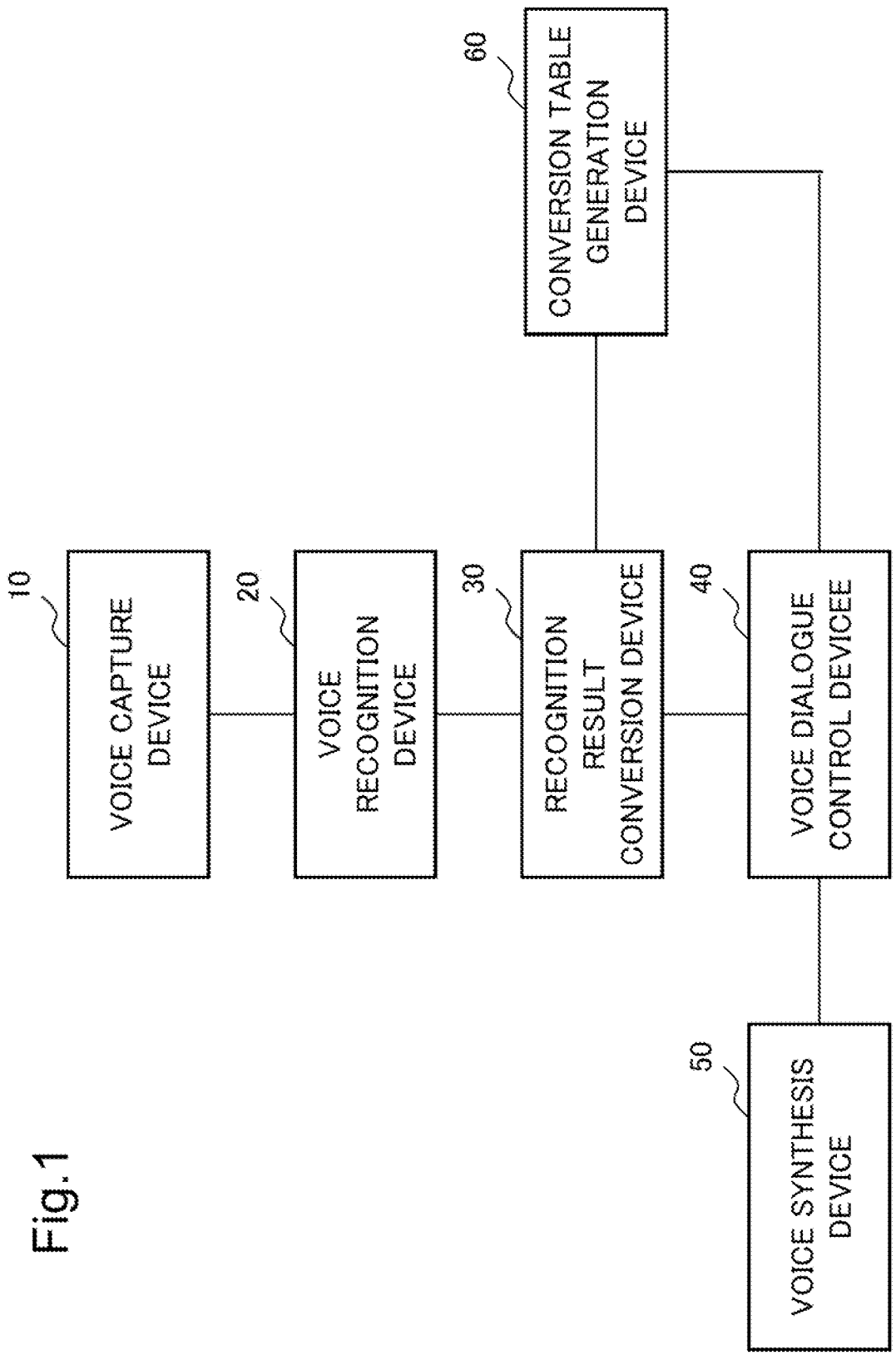
FIG. 1 is a diagram illustrating a configuration of a first example embodiment of the present invention.

A first example embodiment of the present invention will be described in detail with reference to the drawings. FIG. 1 is a diagram illustrating a configuration of a voice dialogue system of the present example embodiment. The voice dialogue system of the present example embodiment includes a voice capture device 10, a voice recognition device 20, a recognition result conversion device 30, a voice dialogue control device 40, a voice synthesis device 50, and a conversion table generation device 60.

Figure 2:
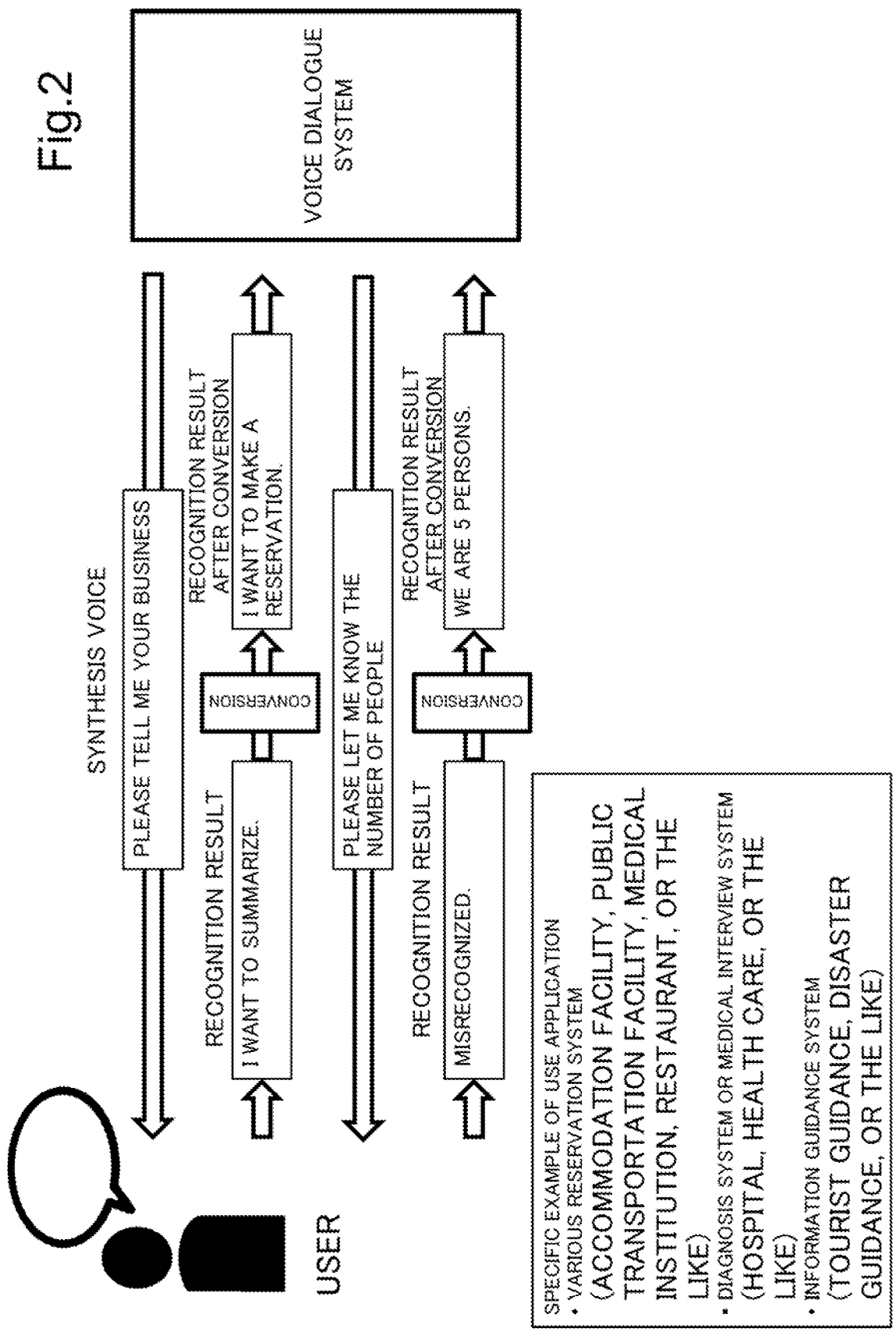
FIG. 2 is a diagram illustrating an example of voice dialogue according to the first example embodiment of the present invention.

Before describing the configuration of the voice dialogue system of the present example embodiment, an example of an operation will be described with reference to FIG. 2 illustrating an example of dialogue. FIG. 2 is a diagram illustrating an example of dialogue between a user and the voice dialogue system in a case where the voice dialogue system of the present example embodiment is provided in a reservation system such as a hotel or transportation facilities. The "conversion" in FIG. 2 is performed by the recognition result conversion device 30. The voice dialogue system of the present example embodiment assumes the use of a dialogue device called a chatbot. The user may interact with the voice dialogue system illustrated in FIG. 2 using a mobile terminal while communicating via a communication network. The user may directly interact with the voice dialogue system.

When the user starts dialogue by operating, for example, a predetermined button or the like, the voice dialogue control device 40 generates a sentence "Please tell me your business", for example, and transmits the sentence to the user as a synthesized voice via the voice synthesis device 50. It is assumed that the user utters, for example, a voice of a request "I want to make a reservation" in response to "Please tell me your business". At that time, the voice capture device 10 receives the voice of the user and outputs the voice data of the user to the voice recognition device 20. It is assumed that the voice recognition device recognizes the voice data of the user and converts the voice data into text data, but the voice recognition device 20 cannot normally recognize the voice "I want to make a reservation" of the user and recognizes "I want to summarize". In Japanese, "reservation" and "summary" are similar-sounding words. Text data that is a recognition result of the voice recognition device 20, "I want to summarize", is input to the recognition result conversion device 30.

Upon receiving the text data from the voice recognition device 20, the recognition result conversion device 30 refers to the conversion table illustrated in FIG. 3 and confirms whether there is a word included in the conversion table in "I want to summarize". FIG. 3 is a diagram illustrating an example of the conversion table. The conversion table is used when the word set as the conversion source word is included in the voice recognition result by the recognition result conversion device 30 and the conversion source word is replaced with the word set as the conversion destination. The conversion table is generated in advance by the conversion table generation device 60 and stored in the recognition result conversion device 30, and the generation thereof will be described later.

Referring to FIG. 3, the recognition result conversion device 30 detects that the word "summary" set as the conversion source of the conversion table is included in "I want to summarize". When "summary" set as the conversion source of the conversion table is detected from the voice recognition result, the recognition result conversion device 30 converts "summary" into "reservation" set as the conversion destination of "summary" in the conversion table. When converting "summary" into "reservation", the recognition result conversion device 30 outputs a sentence in which the voice recognition result has been corrected to "I want to make a reservation" to the voice dialogue control device 40.

The voice dialogue control device 40 that has received the answer from the user which has been corrected to "I want to make a reservation" next outputs a response such as "Please tell me the number of people". It is assumed that, in a case where the user answers "We are 5 persons" in response to "Please tell me the number of people", the voice recognition device 20 converts the answer into "misrecognized". In Japanese, "5 persons" and "misrecognition" are homonym. The recognition result conversion device 30 that has acquired the text data that is the voice recognition result of "misrecognized" detects "misrecognition" of "misrecognized", and when detecting that the text data is included in the "misrecognition" in the conversion table, converts the "misrecognition" into "five persons" of the conversion destination, and corrects the text data to "We are five persons". The recognition result conversion device 30 outputs the voice recognition result corrected to "We are five persons" to the voice dialogue control device 40.

As described above, in the voice dialogue system of the present example embodiment, since the recognition result conversion device 30 corrects the voice recognition result of the voice recognition device 20 on the basis of the conversion table, even in a case where the voice recognition device 20 performs erroneous recognition, the dialogue can be stably continued. The voice dialogue system of the present example embodiment is characterized in that the conversion table generation device 60 automatically generates the conversion table used when correcting the voice recognition result as described above.

First, each device constituting the voice dialogue system in FIG. 1 will be described.

The voice capture device 10 acquires a voice signal of the user's voice via a microphone or the like, samples the voice signal, and converts the voice signal into voice data of a digital signal. The voice capture device 10 outputs the voice data to the voice recognition device 20. The voice capture device 10 may acquire voice data generated from the voice of the user by a terminal device possessed by the user such as a smartphone via a network.

The voice recognition device 20 converts the user's voice data input from the voice capture device 10 into text data by voice recognition. The voice recognition device 20 performs voice recognition of the voice data using an acoustic model, a language model, and a word dictionary, and converts the voice data into text data.

Figure 4:
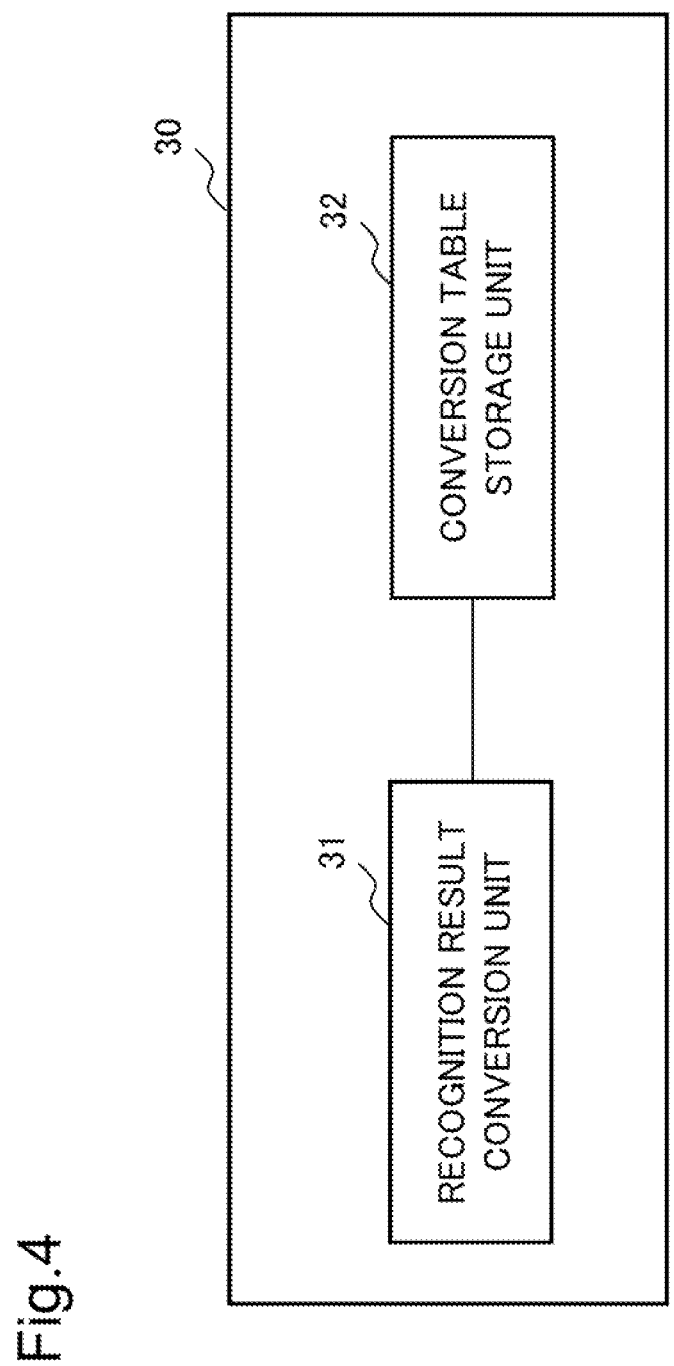
FIG. 4 is a diagram illustrating a configuration of a recognition result conversion device according to the first example embodiment of the present invention.

The recognition result conversion device 30 corrects the sentence included in the text data input from the voice recognition device 20 based on the conversion table. FIG. 4 is a diagram illustrating a configuration of the recognition result conversion device 30. The recognition result conversion device 30 includes a recognition result conversion unit 31 and a conversion table storage unit 32.

The recognition result conversion unit 31 confirms whether a word set as a conversion source in the conversion table is included in a sentence of the text data of the voice recognition result received from the voice recognition device 20. When detecting the word included in the conversion source of the conversion table from the sentence of the voice recognition result, the recognition result conversion unit 31 replaces the detected word with the word of the conversion destination. For example, when the voice recognition result includes "summary", the recognition result conversion unit 31 converts "summary" into "reservation" set as the conversion destination of "summary" in the conversion table.

The conversion table storage unit 32 stores data of the conversion table. The data of the conversion table is generated by the conversion table generation device 60.

The voice dialogue control device 40 analyzes an utterance content of the user using a learning model generated by machine learning, and generates a response sentence according to an analysis result, thereby enabling dialogue. The voice dialogue control device 40 may perform a rule-type dialogue process in which a combination of a question and an answer is set in advance. The voice dialogue control device 40 controls the conversion table generation device 60.

The voice synthesis device 50 converts text data of a sentence of a question or a notification to be transmitted to the user which is input from the voice dialogue control device 40 into voice data, and outputs the voice data.

Figure 5:
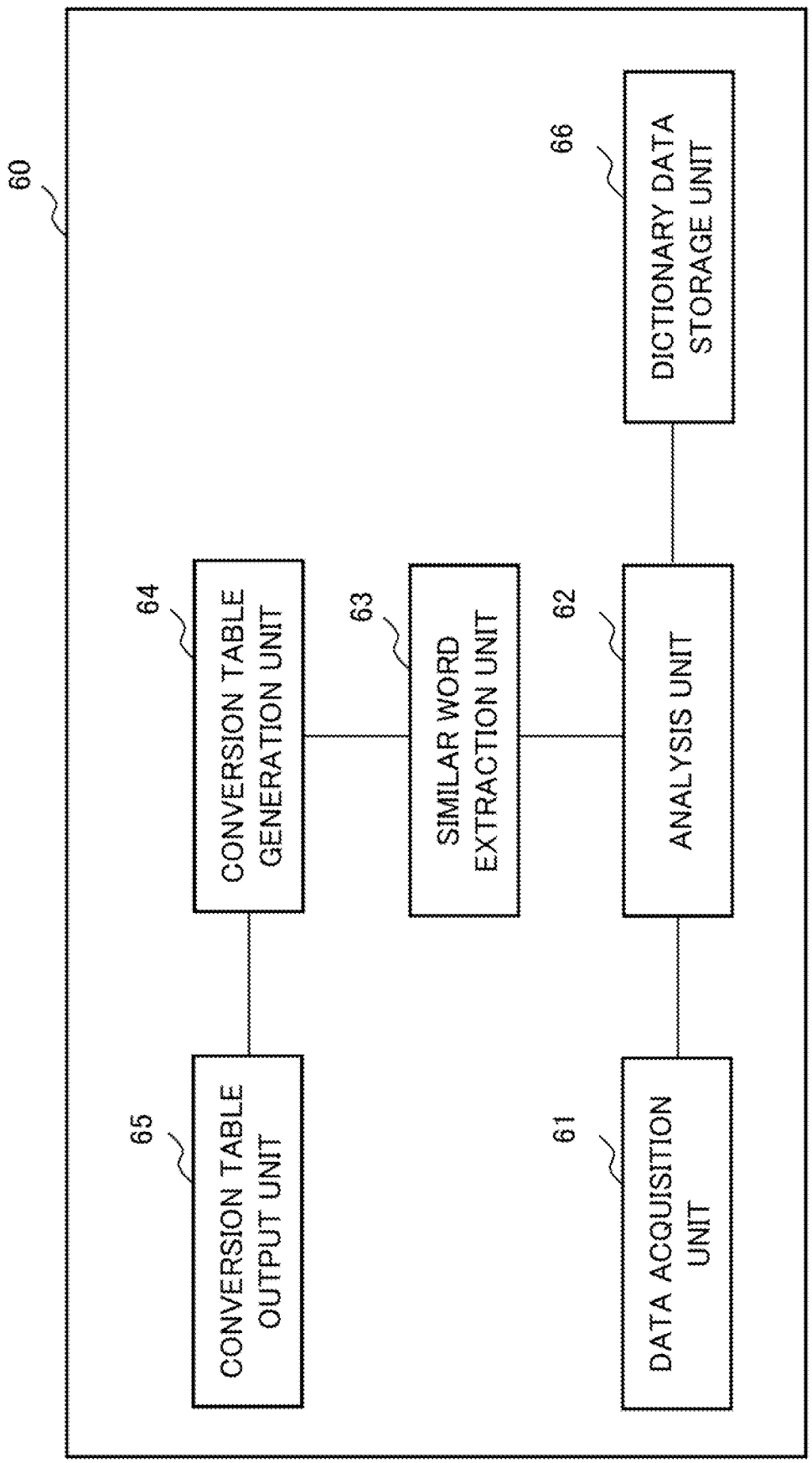
FIG. 5 is a diagram illustrating a configuration of a conversion table generation device according to the first example embodiment of the present invention.

Next, the configuration of the conversion table generation device 60 will be described. FIG. 5 is a diagram illustrating the configuration of the conversion table generation device 60 according to the present example embodiment. The conversion table generation device 60 includes a data acquisition unit 61, an analysis unit 62, a similar word extraction unit 63, a conversion table generation unit 64, a conversion table output unit 65, and a dictionary data storage unit 66.

The data acquisition unit 61 acquires data including a word used for voice dialogue. The data acquisition unit 61 acquires, from the voice dialogue control device 40, data for voice dialogue held inside the voice dialogue control device 40, for example. The voice dialogue data held inside the voice dialogue control device 40 is also referred to as scenario data. For example, in a case where the voice dialogue system is used for a reservation system, the voice dialogue data includes words such as "reservation", "change", and "cancel" used for reservation. FIG. 6 is a diagram illustrating an example of words and phrases used for reservation held inside the voice dialogue control device 40. As illustrated in FIG. 6, the words and phrases include a phrase, a clause, and a short sentence in which a word and a particle are combined. These words and phrases need to be correctly input from the recognition result conversion device 30 to the voice dialogue control device 40, and need to be correctly recognized by the voice dialogue control device 40.

The data acquisition unit 61 may acquire data (conversation history data of the response) of the log of the user's answer and the response output from the voice dialogue control device 40 to the voice synthesis device 50 as data including the word used for the voice dialogue. In the case of the rule-type voice dialogue control device 40, the data acquisition unit 61 may acquire data in which a preset rule such as a relationship between a question and an answer is described.

The analysis unit 62 performs morphological analysis with reference to dictionary data, and extracts a word from the data acquired by the data acquisition unit 61 from the voice dialogue control device 40. The word extracted by the analysis unit 62 is used as a word of the conversion destination in the conversion table. The data acquired from the voice dialogue control device 40 is generated in accordance with a reservation system or the like which is an application field of the voice dialogue system. Therefore, by extracting the word from the data acquired from the voice dialogue control device 40, it is possible to extract the word used in the reservation system without excess or deficiency.

The similar word extraction unit 63 refers to the dictionary data and extracts a similar word of each word extracted by the analysis unit 62. The word extracted by the analysis unit 62 is a word used as a conversion destination in the conversion table. The similar word extraction unit 63 extracts a homonym and a similar-sounding word as similar words for each word extracted by the analysis unit 62.

Figure 7:
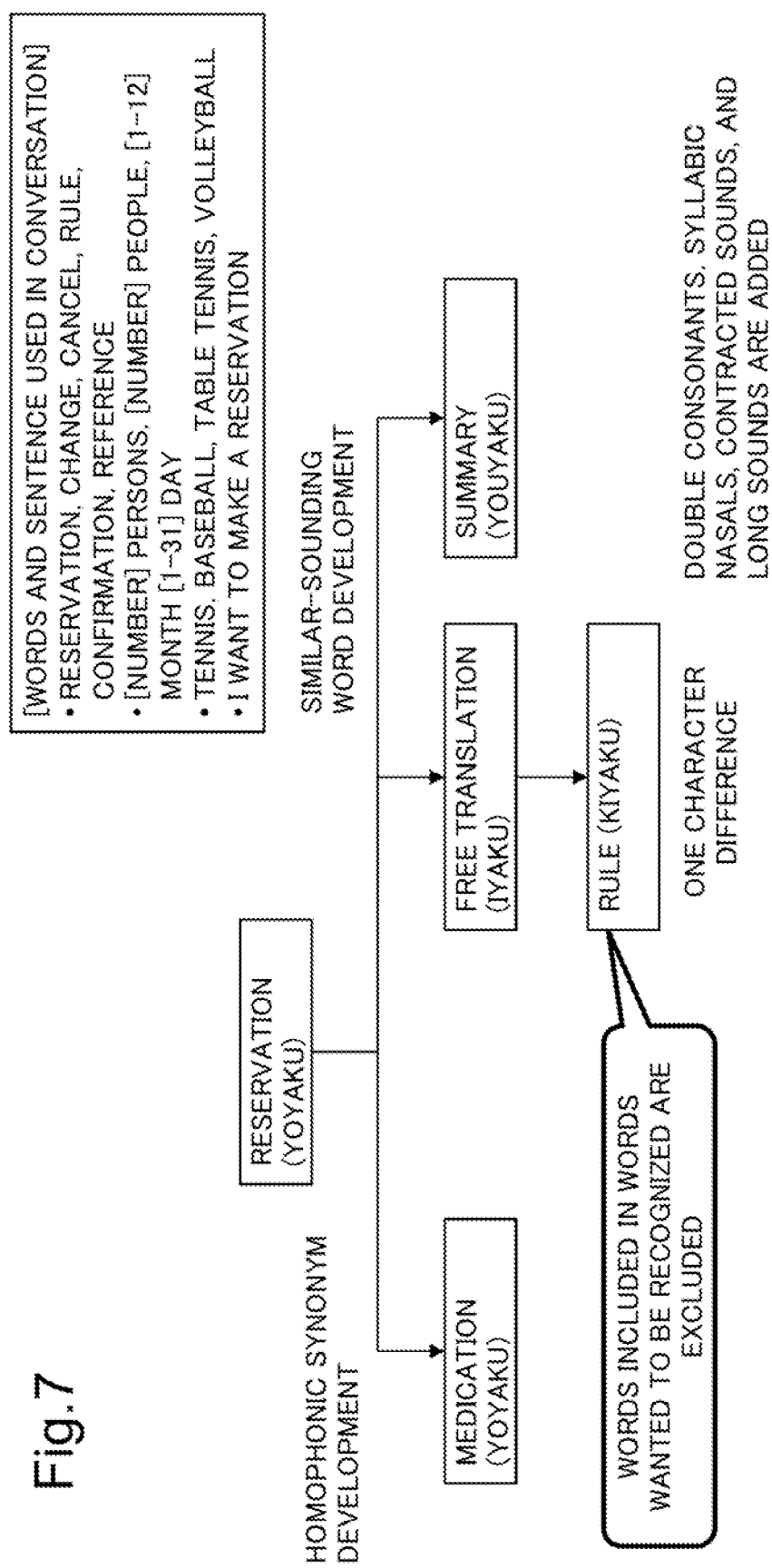
FIG. 7 is a diagram illustrating an example of extraction of a similar word in the first example embodiment of the present invention.

FIG. 7 illustrates an example of a similar word extraction method. FIG. 7 illustrates an example of extracting a similar word of "reservation (YoYaKu)". (YoYaKu) of "reservation (YoYaKu)" is written to describe the reading of the word, and the same applies to other words. The similar word extraction unit 63 first refers to the dictionary data and extracts "medication (YoYaKu)", which is a homonym of "reservation (YoYaKu)" in Japanese. When the homonym is extracted, the similar word extraction unit 63 extracts a similar-sounding word of "reservation (YoYaKu)".

The similar word extraction unit 63 first extracts, as a similar-sounding word of the word of the conversion destination, a similar-sounding word in which one character of "reservation (YoYaKu)" is replaced with another character. For example, the similar word extraction unit 63 extracts "free translation (IYaKu)" obtained by replacing the first character "Yo" of "reservation (YoYaKu)" with "I" as a similar-sounding word of "reservation (YoYaKu)". The similar word extraction unit 63 extracts a similar-sounding word added to any one or a plurality of double consonants, syllabic nasals, contracted sounds, and long sounds in the character string of the word of the conversion destination. For example, the similar word extraction unit 63 extracts "summary (YoUYaKu)" as a similar-sounding word obtained by adding a long sound to "reservation (YoYaKu)" in Japanese among a double consonant, a syllabic nasal, a contracted sound, and a long sound.

When extracting a similar word, the similar word extraction unit 63 does not extract a word to be recognized, that is, a word that matches the word of the conversion destination, as a similar word. For example, it is assumed that "reservation (YoYaKu)" and "rule (KiYaKu)" are used as words to be recognized, that is, words of the conversion destination. At this time, when detecting "rule (KiYaKu)" as a similar-sounding word of "reservation (YoYaKu)" from the dictionary data, the similar word extraction unit 63 does not extract "rule (KiYaKu)" as a similar-sounding word of "reservation (YoYaKu)". This is because, when the "rule (KiYaKu)" is extracted as a similar-sounding word, "rule (KiYaKu)" is included in the conversion source of the "reservation (YoYaKu)" in the conversion table, and the voice recognition result is converted into the "reservation (YoYaKu)" in recognition result conversion device 30 although it is desired to recognize the "rule (KiYaKu)".

When extracting a similar word for each word to be recognized, the similar word extraction unit 63 sends data as illustrated in FIG. 8 in which the extracted similar word is associated with the word to be recognized, that is, the word of the conversion destination to the conversion table generation unit 64. FIG. 8 illustrates an example of data in which the extracted similar word is associated with the word to be recognized, that is, the word of the conversion destination. Although only five similar words are illustrated in the example of FIG. 8, the number of similar words is not limited to the example of FIG. 8, and all the extracted similar words are associated with the word of the conversion destination.

The conversion table generation unit 64 generates a conversion table from the data as illustrated in FIG. 8 in which each of the similar words extracted by the similar word extraction unit 63 is associated with the word of the conversion destination. The conversion table generation unit 64 extracts words associated with a plurality of words of the conversion destination as similar words, and generates a conversion table by associating the extracted similar word with any one of the word of the conversion destinations.

In the word replacement operation in the recognition result conversion device 30 using the conversion table, the same similar word is converted into any one word of the conversion destination. That is, the word extracted as the similar word is associated with one of the words of the conversion destination as the word of the conversion source in the conversion table.

The conversion table generation unit 64 performs processing of associating any one of two or more, that is, words associated with a plurality of words of the conversion destination as similar words with any one of the words of the conversion destination on the basis of the priority.

Based on the table of FIG. 9, the conversion table generation unit 64 determines with which word of the conversion destination the similar-sounding word similar to the plurality of words of the conversion destination is to be associated. FIG. 9 illustrates a table used as a criterion for determining a priority when the conversion table generation unit 64 associates the similar-sounding word with the word of the conversion destination in a case where the language is Japanese. In the table of FIG. 9, characters having common consonants in the vertical direction are arranged as "A-row", "Ka-row", and the like. In addition, in the table of FIG. 9, characters having common vowels in the lateral direction are arranged like "A group" and "I group". Although the sonant is not illustrated in FIG. 9, a table including the sonant may be used. For example, in the table of FIG. 9, "Ga-row" may be included between "Ka-row" and "Sa-row".

With reference to the table of FIG. 9, when a target character, that is, a character converted from an original character in extracting a similar-sounding word is converted into a sound, the conversion table generation unit 64 preferentially associates a similar word with a word in the same row or the same group as the original character. "Free translation (IYaKu)", which is a similar-sounding word common to "rule (KiYaKu)" and "reservation (YoYaKu)" in Japanese, is obtained by converting the first characters of "rule (KiYaKu)" and "reservation (YoYaKu)". At this time, the conversion table generation unit 64 determines the priority of which one of the "rule (KiYaKu)" and the "reservation (YoYaKu)" is to be associated with the "free translation (IYaKu)" on the basis of the similarity of the first character converted from the original character when extracting the similar-sounding word. The vowel "I" obtained by converting the first character of "free translation (IYaKu)" into a sound coincides with "Ki" obtained by converting the first character of the "rule (KiYaKu)" into a sound. The conversion table generation unit 64 preferentially associates the converted characters with the word of the conversion destination in the same row or the same group before and after conversion. Here, the same row as the original character means a character having the same vertical column in FIG. 9 and a character having a common consonant. In addition, the same group as the original character means a character having the same horizontal column in FIG. 9 and a character having a common vowel.

Similarly, when associating a similar-sounding word with "rule (KiYaKu)" and "reservation (YoYaKu)", the conversion table generation unit 64 associates "useful (OYaKu)", which is a similar-sounding word common to both, with the same group, that is, "reservation (YoYaKu)" in which vowels are common. Further, the conversion table generation unit 64 associates "medicine (IYaKu)", "leaping (HiYaKu)", "secret medicine (HiYaKu)", and "reagent (ShiYaKu)", which are the similar-sounding words common to both, with the same row, that is, the common consonant "rule (KiYaKu)".

In a case where any one of the row and the group is overlapped in the table of FIG. 9 and the priority is the same, for example, the conversion table generation unit 64 preferentially makes association with the word of the conversion destination having many similar words. Similarly, the conversion table generation unit 64 preferentially makes association with a word of the conversion destination having many similar words when the same homonym is common to two or more words of the conversion destination. For example, on the table of FIG. 9, the conversion table generation unit 64 associates "child actor (KoYaKu)" whose rows and group do not match with "rule (KiYaKu)" and "reservation (YoYaKu)" with "rule (KiYaKu)" having many similar words.

When the number of similar words is large, or when neither a row nor a group overlaps on the table of FIG. 9, the conversion table generation unit 64 makes association with a word having a high use frequency. For a similar word for which the conversion table generation unit 64 cannot determine the priority of association, the operator may input a word of the conversion destination to be associated with. When the word of the conversion destination with which the similar word is associated is determined, the conversion table generation unit 64 generates the data conversion table as illustrated in FIG. 3 in which the similar word determined as the conversion source is associated with the word of the conversion destination. The conversion table generation unit 64 does not include, in the conversion table, the word of the conversion destination for which there is no similar word serving as a conversion source.

The word of the conversion destination with which the similar word is associated with the priority as described above is determined, and the similar word similar to two or more words of the conversion destination is associated as a conversion source of any one word of the conversion destination.

After generating the conversion table, the conversion table generation unit 64 outputs the conversion table to the conversion table output unit 65.

The conversion table output unit 65 outputs the conversion table generated by the conversion table generation unit 64 to the recognition result conversion device 30.

The dictionary data storage unit 66 stores dictionary data. In addition to a normal dictionary, the dictionary data in which technical terms in a field to which the voice dialogue system is applied are collected is used. For example, in the case of a voice dialogue system used for reservation or consultation of reservation at a counter in a hospital, dictionary data in the medical field is used.

Each processing in the data acquisition unit 61, the analysis unit 62, the similar word extraction unit 63, the conversion table generation unit 64, the conversion table output unit 65, and the dictionary data storage unit 66 is performed by executing a computer program on a central processing unit (CPU). The CPU executes a computer program stored in a storage device such as a hard disk drive by reading the computer program into a memory.

The dictionary data storage unit 66 includes a storage device such as a non-volatile semiconductor storage device or a hard disk drive. The dictionary data storage unit 66 may be configured by a combination of a plurality of types of storage devices. In addition, the dictionary data storage unit 66 may be provided in a storage device outside the conversion table generation device 60 and connected to the conversion table generation device 60 via a network.

Next, an operation of the conversion table generation device 60 will be described. FIG. 10 is a diagram illustrating an operation flow of the conversion table generation device 60.

When the conversion table generation device 60 starts the operation of generating a conversion table, the data acquisition unit 61 acquires data including a word to be recognized from the voice dialogue control device 40. When acquiring data including a word to be recognized, the data acquisition unit 61 sends the acquired data to the analysis unit 62.

When the data including the word to be recognized is acquired, the analysis unit 62 extracts the word to be recognized in the voice recognition, that is, the word to be used as the word of the conversion destination in the conversion table from the acquired data (Step S11). The analysis unit 62 refers to the dictionary data stored in the dictionary data storage unit 66 and extracts the dictionary data as a candidate for the word of the conversion destination. When extracting a candidate of the word of the conversion destination, the analysis unit 62 also extracts words related to numbers such as the number of people and the date.

When extracting a word, the analysis unit 62 sends data of the extracted word to the similar word extraction unit 63. When receiving the data of the word, the similar word extraction unit 63 extracts a similar word for each received word (Step S12). After extracting the similar word, the similar word extraction unit 63 sends data of the similar word associated with each word of the conversion destination to the conversion table generation unit 64. When receiving the data of the similar word, the conversion table generation unit 64 determines which word of the conversion destination the similar word is associated with on the basis of the priority (Step S13).

The conversion table generation unit 64 determines, on the basis of the table as illustrated in FIG. 9, which word of the conversion destination is to be associated with a similar-sounding word similar to two or more words of the conversion destination. When determining, on the basis of the priority, which word of the conversion destination the similar word is to be associated with, the conversion table generation unit 64 generates, as a conversion table, a data table in which the similar word determined as the conversion source is associated with the word of the conversion destination (Step S14). After generating the conversion table, the conversion table generation unit 64 outputs the conversion table to the conversion table output unit 65. The conversion table output unit 65 sends the conversion table to the recognition result conversion device 30. The conversion table sent to the recognition result conversion device 30 is used when the recognition result conversion device 30 corrects the voice recognition result.

The voice capture device 10, the voice recognition device 20, the recognition result conversion device 30, the voice dialogue control device 40, the voice synthesis device 50, and the conversion table generation device 60 constituting the voice dialogue system of the present example embodiment may be installed at different positions and connected via a network. In addition, two or more devices constituting the voice dialogue system may be configured as an integrated device.

The voice dialogue system of the present example embodiment can be used for, for example, a reservation system. The reservation system using the voice dialogue system of the present example embodiment can be used for a system that receives a reservation, confirmation of the reservation, cancellation of the reservation, or the like from a user in an accommodation facility, a public transportation facility, a medical institution, a restaurant, or the like. The voice dialogue system of the present example embodiment can also be used in a diagnosis system or a medical interview system in a hospital. In addition, the voice dialogue system of the present example embodiment can also be used for an information guidance system such as tourist guidance, traffic guidance, and notification of disaster information. The application destination of the voice dialogue system of the present example embodiment is not limited to the above example as long as the system performs voice dialogue.

In the above description, the Japanese word has been described, but the conversion table can be similarly generated also in other languages to correct the voice recognition result. For example, in English, the conversion table generation device 60 replaces a word of the conversion destination with a phonetic symbol, extracts a homonym and a similar-sounding word, and generates a conversion table. For example, when "beach" is a conversion destination, the conversion table generation device 60 generates a conversion table in which "beech" that is a homonym and "reach" that is a similar-sounding word are used as conversion sources. The priority when determining the destination to associate similar words similar to a plurality of words is set in advance on the basis of, for example, similarity in pronunciation.

The conversion table generation device 60 of the voice dialogue system of the present example embodiment extracts a word to be recognized by voice recognition, that is, a similar word of a word used in dialogue, and generates a conversion table when the recognition result conversion device 30 corrects the voice recognition result, using the word used in the dialogue as a conversion destination and the similar word as a conversion source. The conversion table generation device 60 according to the present example embodiment extracts, as similar words, homonyms and similar-sounding words that are similar to a word to be recognized extracted from data acquired from the voice dialogue control device 40 and are likely to be erroneously recognized in voice recognition, and generates a conversion table for converting a voice recognition result. In addition, when generating the conversion table, the conversion table generation device 60 determines a similar word to be associated with the word of the conversion destination as the word of the conversion source according to the priority criterion, thereby automatically generating the conversion table indicating the correspondence between the conversion destination and the conversion source. Therefore, the conversion table generation device 60 of the present example embodiment can generate the conversion table for correcting the voice recognition result without requiring work by the operator.

In addition, even in a case where the voice recognition result is erroneously recognized by being converted on the basis of the conversion table generated by the conversion table generation device 60, the sentence corrected by being converted into a correct word is input to a voice dialogue control device. When the sentence converted into the correct word is input to the voice dialogue control device, rehearing and erroneous recognition are suppressed in the voice dialogue system, and the accuracy of dialogue in the voice dialogue system is improved. Therefore, the voice dialogue system of the present example embodiment can improve the accuracy of voice recognition while suppressing the necessary workload by automatically generating the conversion table of the word that may be erroneously recognized in voice recognition.

Second Example Embodiment

Figure 11:
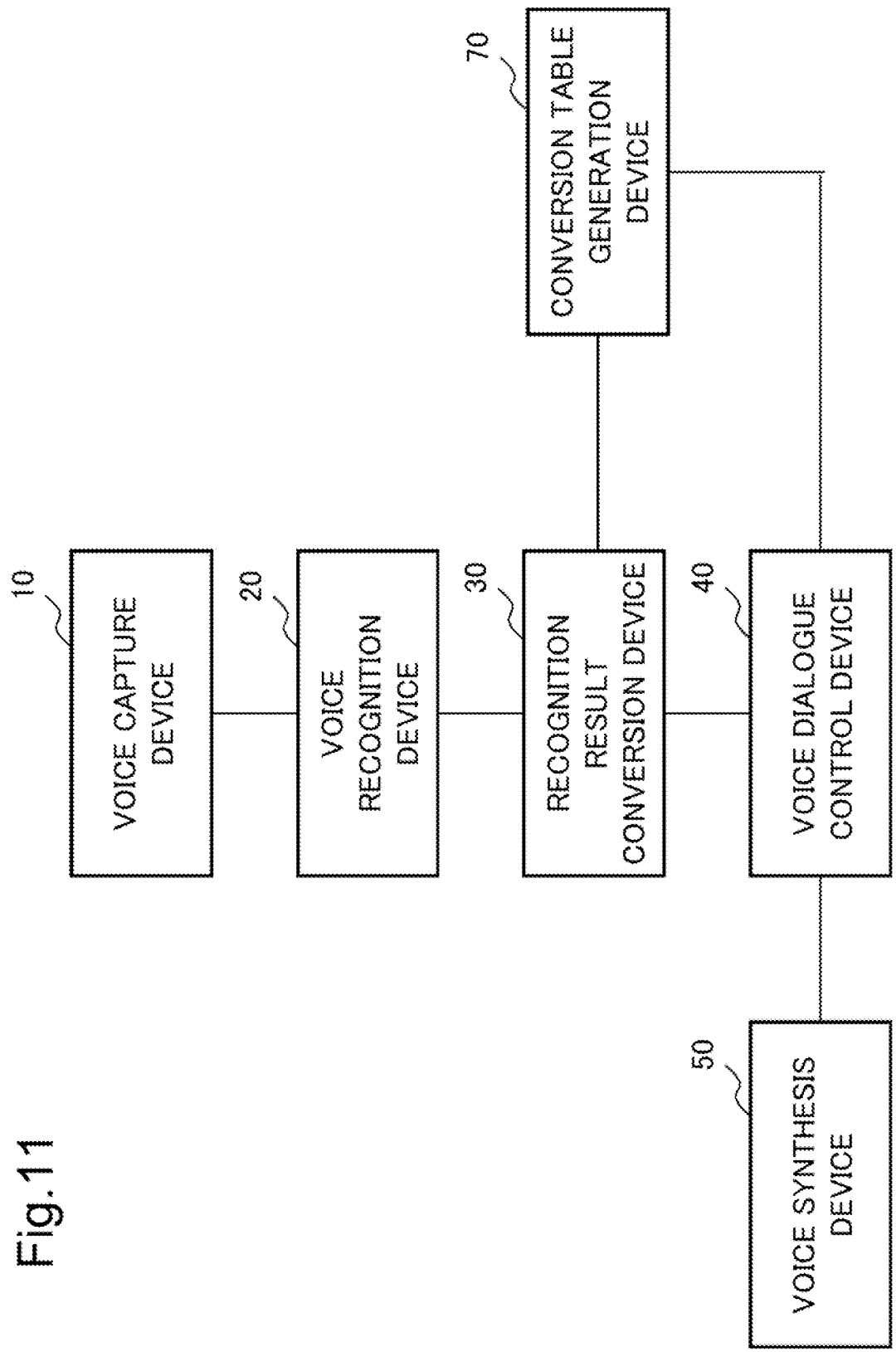
FIG. 11 is a diagram illustrating a configuration of a second example embodiment of the present invention.

A second example embodiment of the present invention will be described in detail with reference to the drawings. FIG. 11 is a diagram illustrating a configuration of a voice dialogue system of the present example embodiment. The voice dialogue system according to the first example embodiment replaces a word included in a sentence in text data output as a voice recognition result on the basis of the conversion table generated by the conversion table generation device 60. In addition to such a configuration, the voice dialogue system of the present example embodiment has a function of updating the conversion table on the basis of the log of the use frequency.

The voice dialogue system of the present example embodiment includes a voice capture device 10, a voice recognition device 20, a recognition result conversion device 30, a voice dialogue control device 40, a voice synthesis device 50, and a conversion table generation device 70. The configurations and functions of the voice capture device 10, the voice recognition device 20, the recognition result conversion device 30, the voice dialogue control device 40, and the voice synthesis device 50 of the present example embodiment are similar to those of the device having the same name in the second example embodiment.

Figure 12:
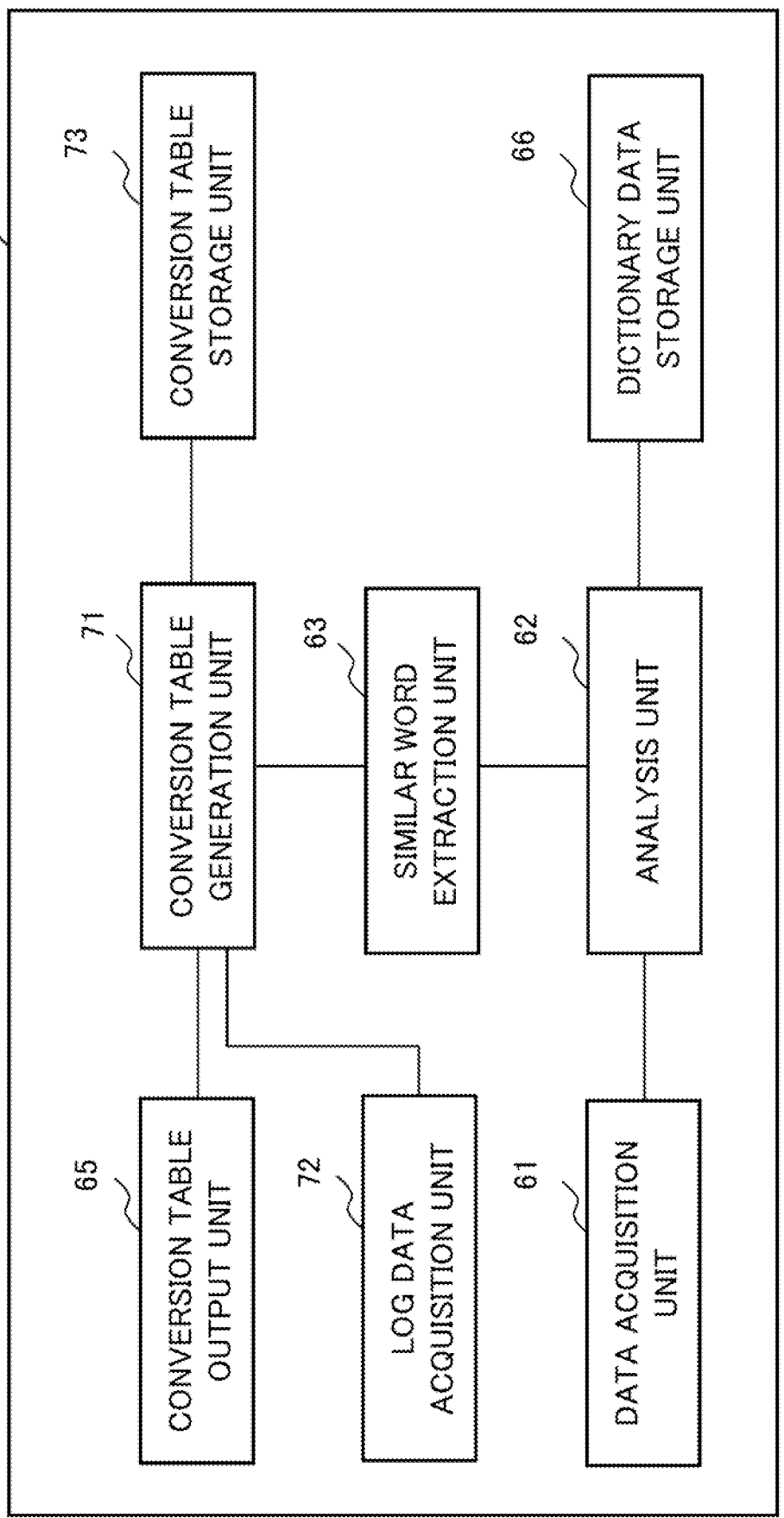
FIG. 12 is a diagram illustrating a configuration of a conversion table generation device according to the second example embodiment of the present invention.

A configuration of the conversion table generation device 70 will be described. FIG. 12 is a diagram illustrating a configuration of the conversion table generation device 70. The conversion table generation device 70 includes a data acquisition unit 61, an analysis unit 62, a similar word extraction unit 63, a conversion table generation unit 71, a conversion table output unit 65, a dictionary data storage unit 66, a log data acquisition unit 72, and a conversion table storage unit 73.

The configurations and functions of the data acquisition unit 61, the analysis unit 62, the similar word extraction unit 63, the conversion table output unit 65, and the dictionary data storage unit 66 according to the present example embodiment are similar to the components having the same names in the conversion table generation device 60 according to the second example embodiment.

The conversion table generation unit 71 has a function of updating the conversion table on the basis of the log acquired by the log data acquisition unit 72, in addition to the same function as the conversion table generation unit 64 of the second example embodiment. The conversion table generation unit 71 outputs the generated conversion table to the conversion table output unit 65 and stores the table in the conversion table storage unit 73.

The log data acquisition unit 72 acquires a log from the voice dialogue system. The log data acquisition unit 72 acquires, as a log, data of the word converted by the recognition result conversion device 30 and the number of times of conversion.

The conversion table storage unit 73 stores data of the conversion table generated by the conversion table generation unit 71.

Each processing in the conversion table generation unit 71 and the log data acquisition unit 72 is performed by executing a computer program on the CPU similarly to the processing of other parts. The CPU executes a computer program stored in a storage device such as a hard disk drive by reading the computer program into a memory.

The conversion table storage unit 73 includes a storage device such as a non-volatile semiconductor storage device or a hard disk drive. The conversion table storage unit 73 may be configured by a combination of a plurality of types of storage devices.

Figure 13:
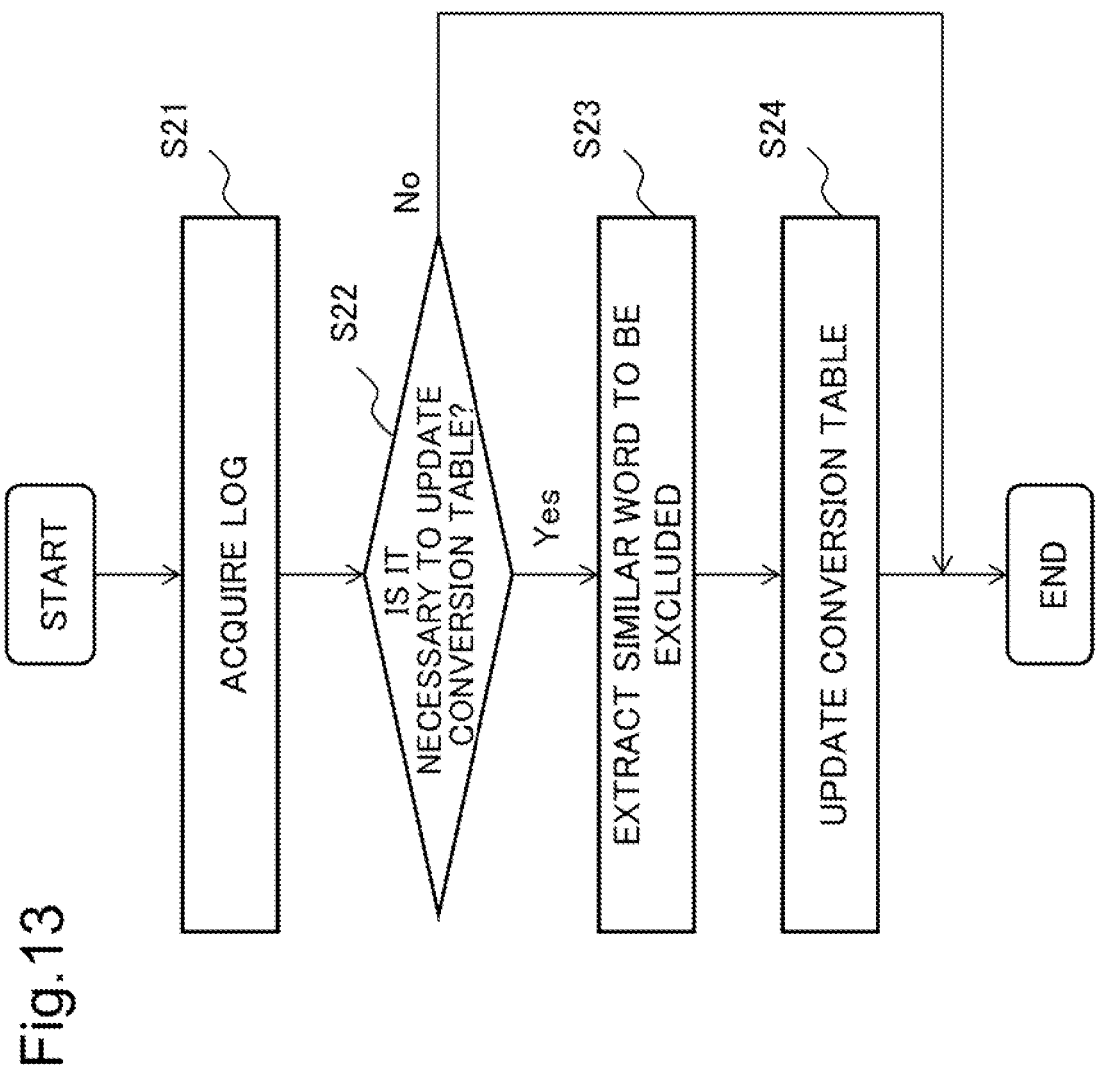
FIG. 13 is a diagram illustrating an operation flow of the conversion table generation device according to the second example embodiment of the present invention.

An operation of the voice dialogue system of the present example embodiment will be described. The operation of the entire voice dialogue system and the operation until the conversion table is first generated in the conversion table generation device 70 are similar to those in the second example embodiment. Therefore, only the operation of updating the conversion table in the conversion table generation device 70 will be described below with reference to FIG. 13. FIG. 13 is a diagram illustrating an operation flow when the conversion table is updated on the basis of the log in the conversion table generation device 70.

When the conversion table generation device 70 starts the operation of updating the conversion table, the log data acquisition unit 72 acquires the log data from the recognition result conversion device 30 (Step S21). The log is acquired as data in which the number of times the recognition result conversion device 30 has replaced the conversion source word with the word of the conversion destination in the conversion table is recorded for each word of the conversion source. The log data acquisition unit 72 sends the acquired log data to the conversion table generation unit 71.

When the log is acquired, the conversion table generation unit 71 starts the operation of updating the conversion table. The conversion table generation unit 71 counts the number of times of conversion in recognition result conversion device 30 for each similar word as a conversion source. The conversion table generation unit 71 checks whether there is a similar word whose number of times of use is less than a criterion within a preset period, and determines whether it is necessary to update the conversion table. When the number of times of conversion is equal to or more than the preset number of times and the conversion table is unnecessary (No in Step S22), the conversion table generation unit 71 ends the operation without updating the conversion table.

When the number of times of conversion is less than the preset number of times and the conversion table is necessary to be updated (Yes in Step S22), the conversion table generation unit 71 deletes the similar word of which the number of times of conversion is less than the criterion from the word of the conversion source in the conversion table (Step S23). In a case where the word of the conversion destination in which the word of the conversion source disappears by the deletion is generated, the conversion table generation unit 71 deletes the word of the conversion destination in which the word of the conversion source disappears from the conversion table.

When the similar word of which the number of times of conversion is less than the criterion is excluded from the conversion source word of the conversion table, the conversion table generation unit 71 updates the data of the conversion table stored in the conversion table storage unit 73 using the data of the conversion table in which the target similar word is excluded from the conversion source (Step S24). In addition, the conversion table generation unit 71 outputs the updated conversion table to the conversion table output unit 65.

When receiving the updated conversion table, the conversion table output unit 65 outputs the updated conversion table to the recognition result conversion device 30. The updated conversion table input to the recognition result conversion device 30 is stored in the conversion table storage unit 32. When a sentence in the text data input from the voice recognition device 20 includes a word for which the conversion table is set, the recognition result conversion unit 31 of the recognition result conversion device 30 converts the word according to the updated conversion table, and outputs the text data of the corrected sentence to the voice dialogue control device 40.

In the above description, the conversion table is updated based on the log in the recognition result conversion device 30, but the conversion table generation unit 71 may determine whether the conversion result is appropriate based on the log and determine whether the conversion table needs to be updated. For example, the conversion table generation unit 71 may acquire the log of the voice dialogue control device 40 and review the word of the conversion source with respect to the word of the conversion destination in which the number of times the voice dialogue control device 40 has failed to correctly recognize is equal to or more than a preset criterion. In such a configuration, the conversion table generation unit 71 acquires data of the number of times the voice recognition of the answer result from the user has been not appropriate in the voice dialogue control device 40. The number of times the voice recognition of the answer result from the user is not appropriate refers to, for example, the number of times the voice dialogue control device 40 has not been able to specify the answer result as the answer result of the user and has made re-inquiry.

The conversion table generation unit 71 refers to the log of the recognition result conversion device 30 and checks the number of times of conversion for the word of the conversion destination that has not been correctly recognized. When the number of times of conversion is less than the preset number of times, the conversion table generation unit 71 determines that update of the conversion table is unnecessary. This is because when the number of times of conversion is less than the preset number of times, there is a low possibility that the conversion table has a factor that the voice dialogue control device 40 has failed to perform appropriate conversion.

When the number of times of conversion is equal to or more than the preset number of times, the conversion table generation unit 71 excludes a word that may cause erroneous conversion from the word of the conversion source. For example, the conversion table generation unit 71 regards the word of the conversion source having a high conversion frequency in the recognition result conversion device 30 as a word having a possibility of erroneous conversion and excludes the word from the conversion source.

The conversion table generation unit 71 may compare the logs of both the recognition result conversion device 30 and the voice dialogue control device 40 to confirm whether the voice dialogue control device 40 has appropriately responded when the recognition result conversion device 30 has performed conversion. The conversion table generation unit 71 may count the number of times of re-inquiry when the recognition result conversion device 30 has performed conversion, and may exclude the word of the conversion source of the recognition result conversion device 30 from the conversion table when the number of times of re-inquiry exceeds a preset criterion. In addition, in a case where the word excluded from the conversion table is a similar word of two words of the conversion destination, the conversion table generation unit 71 may update the conversion table by associating the word with another word of the conversion destination. In a case where there are further two or more candidates for the word of the conversion destination to be associated with the word excluded from the conversion table, the conversion table generation unit 71 determines association according to the same priority criterion as in the first example embodiment.

The conversion table generation unit 71 may update the conversion table by reviewing the word of the conversion destination to be associated only with the similar word of which the priority cannot be specified on the basis of the table of FIG. 9. In addition, the conversion table generation unit 71 may randomly associate a similar word of which the priority cannot be determined by the priority criterion with any word of the conversion destinations, and update the association based on the log. With such a configuration, it is possible to automatically generate the conversion table without requiring correction of association or the like by the operator.

The conversion table generation device 70 according to the present example embodiment acquires a log in the voice dialogue system and corrects the conversion table based on the log. For example, the conversion table generation device 70 acquires log data indicating the frequency of conversion in the voice recognition device, and deletes an unused similar word of the conversion source and an unused conversion table. In this way, by updating the conversion table, the amount of data when the recognition result conversion device refers to the recognition result can be suppressed, so that it is possible to suppress a decrease in processing speed when the voice recognition result is corrected. As a result, it is possible to improve the accuracy of the voice dialogue while suppressing a decrease in the response speed of the voice dialogue system to the answer of the user.

Third Example Embodiment

Figure 14:
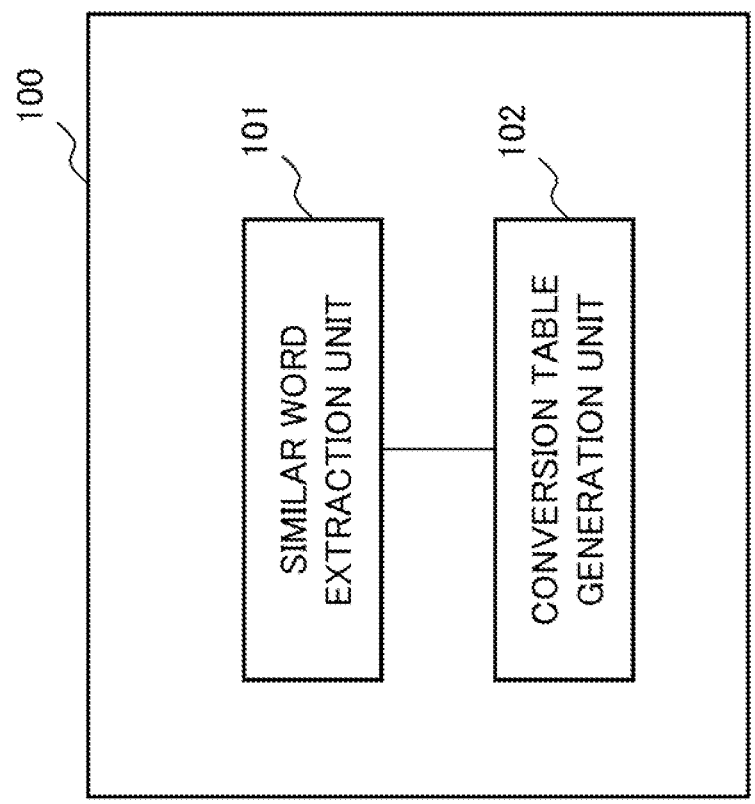
FIG. 14 is a diagram illustrating a configuration of a conversion table generation device according to a third example embodiment of the present invention.

A third example embodiment of the present invention will be described in detail with reference to the drawings. FIG. 14 is a diagram illustrating a configuration of a conversion table generation device 100 according to the present example embodiment. The conversion table generation device 100 according to the present example embodiment includes a similar word extraction unit 101 and a conversion table generation unit 102.

The similar word extraction unit 101 extracts similar words similar to first words, each of the first words is included in a word group used in a dialogue. The word used in the dialogue is, for example, a word included in text data after conversion when the voice recognition device correctly converts voice into text data without erroneous recognition. The word used in the dialogue is, for example, a word input to the voice dialogue control device 40 when the conversion table generation device 100 is used in the voice dialogue control devices of the first example embodiment and the second example embodiment. The first word corresponds to a word of the conversion destination in the conversion table generation units of the first example embodiment and the second example embodiment. The similar word refers to a homonym and a similar-sounding word of the first word.

The conversion table generation unit 102 associates a similar word, as a second word, similar to the plurality of first words among the extracted similar words with any one of the first words on the basis of the priority, and generates a conversion table for voice recognition with the second word as a conversion source and the first word as a conversion destination. The priority refers to, for example, a criterion based on the table of FIG. 9 of the first example embodiment. The conversion table generation unit 102 associates one similar word with only one first word. On the other hand, a plurality of similar words may be associated with one first word as a second word. The conversion table generation unit 102 generates, for voice recognition, a conversion table in which the first word is a conversion destination and the second word is a conversion source by using a result of association of similar words. The conversion table is used, for example, when correcting the voice recognition result in the recognition result conversion devices 30 of the first example embodiment and the second example embodiment.

Each of the conversion table generation device 60 of the second example embodiment and the conversion table generation device 70 of the third example embodiment is an example of the conversion table generation device 100 of the present example embodiment. The similar word extraction units 63 of the second example embodiment and the third example embodiment are examples of the similar word extraction unit 101 of the present example embodiment. Further, each of the conversion table generation unit 64 of the second example embodiment and the conversion table generation unit 71 of the third example embodiment are examples of the conversion table generation unit 102 of the present example embodiment.

Figure 15:
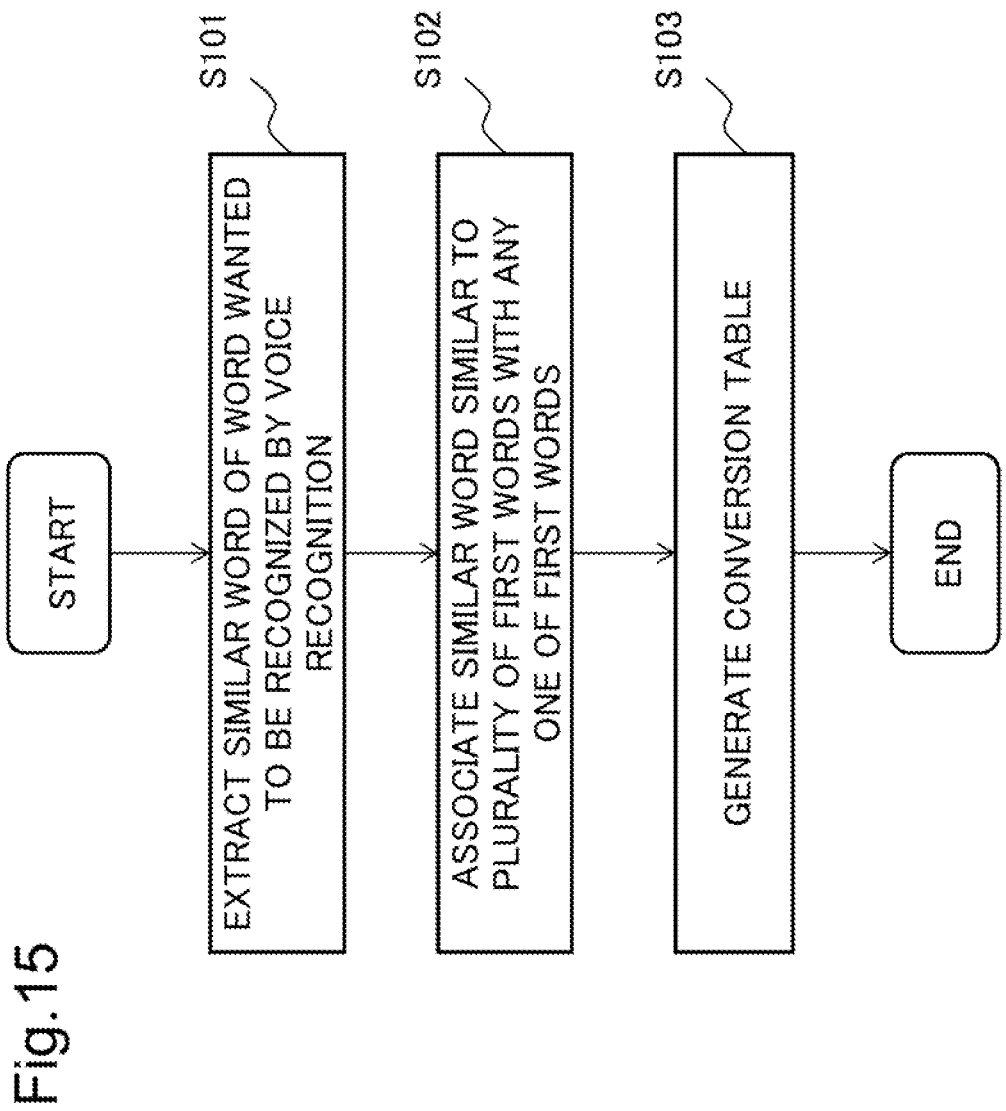
FIG. 15 is a diagram illustrating an operation flow of the conversion table generation device according to the third example embodiment of the present invention.

An example of the operation of the conversion table generation device 100 of the present example embodiment will be described. FIG. 15 is a diagram illustrating an operation flow of the conversion table generation device 100 according to the present example embodiment. The similar word extraction unit 101 of the conversion table generation device 100 extracts a similar word similar to the first word for each of the first words included in the word group used in the dialogue (Step S101). The similar word extraction unit 101 repeats the operation of extracting a similar word for one of the plurality of first words included in the word group and extracting a similar word for another first word, and extracts a similar word of each of the first words included in the word group.

When the similar word is extracted for each of the first words, the conversion table generation unit 102 associates the similar word similar to the plurality of first words among the extracted similar words with any one of the first words as the second word on the basis of the priority (Step S102). When the similar word extracted by the conversion table generation unit 102 corresponds to a similar word of the plurality of first words, the conversion table generation unit 102 determines which first word the similar word is associated with, for example, using a criterion as illustrated in FIG. 9. This is because the similar word is used as the second word of the conversion source in the conversion table, but it is necessary that any one of the first words of the conversion destination is determined for each of the second words of the conversion source. When a similar word similar to the plurality of first words is associated with any one of the first words, the conversion table generation unit 102 generates a conversion table for correcting the voice recognition result of the second word as the conversion source and the first word as the conversion destination on the basis of the association result (Step S103).

The conversion table generation device 100 according to the present example embodiment generates a conversion table used for correcting a recognition result in voice recognition as table data in a format in which the first word as a conversion destination is associated with the second word as a conversion source. The conversion table generated in this manner can be used when the word to be recognized as the first word in the voice recognition is erroneously recognized as a similar word similar to the first word, and when the erroneously recognized similar word is the second word, the word is converted into the first word that is a correct word. Therefore, the accuracy of the voice recognition can be improved by correcting the voice recognition result using the conversion table generated by the conversion table generation device 100 of the present example embodiment.

The conversion table generation device 100 of the present example embodiment determines which first word the similar word of the first word that is the word of the conversion destination is to be the conversion source by using the priority criterion based on the table illustrated in FIG. 9. Therefore, the conversion table generation unit 102 can automatically associate each of the similar words of the first words extracted by the similar word extraction unit 101 with any one of the first words to generate the conversion table in which the first word is the conversion destination and the second word that is the similar word of the first word is the conversion source. Therefore, the conversion table generation device 100 of the present example embodiment can automatically generate a conversion table used when replacing a word erroneously recognized in voice recognition. As a result, by using the conversion table generation device 100 of the present example embodiment, it is possible to suppress the workload necessary for generating the conversion table for correcting the voice recognition result.

Figure 16:
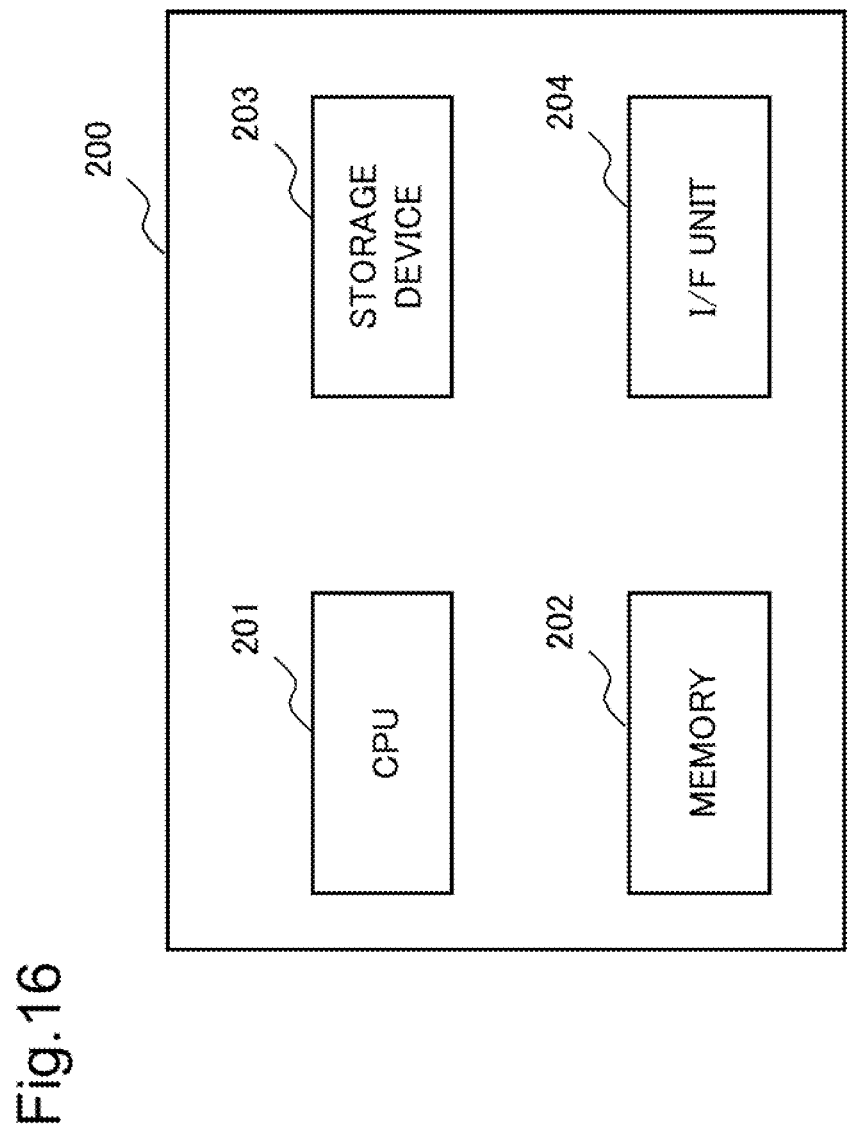
FIG. 16 is a diagram illustrating an example of another configuration of the present invention.

Each processing in the conversion table generation device according to the first to third example embodiments can be performed by executing a computer program on a computer. FIG. 16 illustrates an example of a configuration of a computer 200 that executes a computer program for performing each processing in the conversion table generation device. The computer 200 includes a CPU 201, a memory 202, a storage device 203, and an interface (I/F) unit 204.

The CPU 201 reads and executes the computer program for performing each processing from the storage device 203. The arithmetic processing unit that executes the computer program may be configured by a combination of a CPU and a GPU instead of the CPU 201. The memory 202 includes a dynamic random access memory (DRAM) or the like, and temporarily stores the computer program executed by the CPU 201 and data being processed. The storage device 203 stores the computer program executed by the CPU 201. The storage device 203 includes, for example, a non-volatile semiconductor storage device. As the storage device 203, another storage device such as a hard disk drive may be used. The I/F unit 204 is an interface that inputs and outputs data to and from another unit of the voice dialogue system, a terminal of the network to be managed, and the like. The computer 200 may further include a communication module that communicates with another information processing device via a communication network. In addition, the voice recognition devices 20, the recognition result conversion devices 30, and the voice dialogue control devices 40 of the first example embodiment and the second example embodiment can have similar configurations.

The computer program performed in each processing can also be stored in a recording medium and distributed. As the recording medium, for example, a magnetic tape for data recording or a magnetic disk such as a hard disk can be used. As the recording medium, an optical disk such as a compact disc read only memory (CD-ROM) can also be used. A non-volatile semiconductor storage device may be used as a recording medium.

Some or all of the above example embodiments may be described as the following supplementary notes, but are not limited to the following.

(Supplementary Note 1)

A conversion table generation device including:
a similar word extraction means configured to extract a similar word similar to a first word for each of the first words included in a word group used in a dialogue; and
a conversion table generation means configured to perform voice recognition that associates a similar word similar to a plurality of the first words among the extracted similar words as a second word with any one of the first words based on priority, and generate a conversion table having the second word as a conversion source and the first word as a conversion destination.

(Supplementary Note 2)

The conversion table generation device according to Supplementary Note 1, wherein
the conversion table generation means determines the priority based on similarity between the first word and a vowel or a consonant of the similar word.

(Supplementary Note 3)

The conversion table generation device according to Supplementary Note 2, wherein
the conversion table generation means refers to a table in which characters having vowels and consonants in common are arranged in rows and columns, and associates the similar word similar to the plurality of first words with the first word having a matching row or column.

(Supplementary Note 4)

The conversion table generation device according to any one of Supplementary Notes 1 to 3, further including:
a log data acquisition means configured to acquire a log of an operation of replacing and correcting the first word included in a result of voice recognition with the second word using the conversion table, in which
the conversion table generation means updates the conversion table based on the log.

(Supplementary Note 5)

The conversion table generation device according to any one of Supplementary Notes 1 to 4, further including:
a data acquisition means configured to acquire data including a word group used in a dialogue; and
an analysis means configured to extract a word from data including a word group used in the dialogue, in which
the similar word extraction means extracts the similar word for each word extracted by the analysis means.

(Supplementary Note 6)

A voice dialogue system including:
a conversion table generation device according to any one of
Supplementary Notes 1 to 5;
a voice recognition means configured to convert input voice data into a sentence by voice recognition;
a recognition result conversion means configured to replace the second word with the first word based on the conversion table when the second word included in the conversion table is detected from the sentence recognized by the voice recognition means; and
a voice dialogue control means configured to generate a sentence for response to a sentence output from the recognition result conversion means.

(Supplementary Note 7)

The voice dialogue system according to Supplementary Note 6, further including:
- a voice capture means configured to sample a voice of a user and output the voice as voice data; and
- a voice synthesis means configured to convert the sentence for to response output by the voice dialogue control means into voice data and outputs the voice data as a voice.

(Supplementary Note 8)

A conversion table generation method including:
- extracting a similar word similar to a first word for each of the first words included in a word group used in a dialogue; and
- associating a similar word similar to a plurality of the first words among the extracted similar words as a second word with any one of the first words based on priority, and generate, for voice recognition, a conversion table having the second word as a conversion source and the first word as a conversion destination.

(Supplementary Note 9)

The conversion table generation method according to Supplementary Note 8, wherein
the priority is determined based on similarity between the first word and a vowel or consonant of the similar word.

(Supplementary Note 10)

The conversion table generation method according to Supplementary Note 8 or 9, wherein
the conversion table generation method refers to a table in which characters having vowels and consonants in common are arranged in rows and columns, and associates the similar word similar to the plurality of first words with the first word having a matching row or column.

(Supplementary Note 11)

The conversion table generation method according to any one of Supplementary Notes 8 to 10, further including:
- acquiring a log of an operation of replacing and correcting the first word included in a result of voice recognition with the second word using the conversion table; and
- updating the conversion table based on the log.

(Supplementary Note 12)

The conversion table generation method according to any one of Supplementary Notes 8 to 11, further including:
- acquiring data including a word group used in a dialogue;
- extracting a word from data including a word group used in the dialogue; and
- extracting the similar word for each extracted word.

(Supplementary Note 13)

A recognition result conversion method including:
- extracting a similar word similar to a first word for each of the first words included in a word group used in a dialogue;
- associating a similar word similar to a plurality of the first words among the extracted similar words as a second word with any one of the first words based on priority, and generating a conversion table having the second word as a conversion source and the first word as a conversion destination; and
- replacing, when the second word included in the conversion table is detected from a sentence recognized by voice recognition, the second word with the first word based on the conversion table.

(Supplementary Note 14)

A voice dialogue method including:
- extracting a similar word similar to a first word for each of the first words included in a word group used in a dialogue;
- associating a similar word similar to a plurality of the first words among the extracted similar words as a second word with any one of the first words based on priority, and generating a conversion table having the second word as a conversion source and the first word as a conversion destination;
- converting input voice data into a sentence by voice recognition;
- replacing, when the second word included in the conversion table is detected from the sentence converted from the voice data, the second word with the first word based on the conversion table; and
- generating a sentence for responding to a sentence in which the second word is replaced with the first word.

(Supplementary Note 15)

A recording medium recording a computer program for causing a computer to execute:
- extracting a similar word similar to a first word for each of the first words included in a word group used in a dialogue; and
- associating a similar word similar to a plurality of the first words among the extracted similar words as a second word with any one of the first words based on priority, and generating, for voice recognition, a conversion table having the second word as a conversion source and the first word as a conversion destination.

The present invention has been described above using the above-described example embodiments as schematic examples. However, the present invention is not limited to the above-described example embodiments. That is, the present invention can apply various aspects that can be understood by those skilled in the art within the scope of the present invention.

REFERENCE SIGNS LIST 10 voice capture device
20 voice recognition device
30 recognition result conversion device
31 recognition result conversion unit
32 conversion table storage unit
40 voice dialogue control device
50 voice synthesis device
60 conversion table generation device
61 data acquisition unit
62 analysis unit
63 similar word extraction unit
64 conversion table generation unit
65 conversion table output unit
66 dictionary data storage unit
70 conversion table generation device
71 conversion table generation unit
72 log data acquisition unit
73 conversion table storage unit
101 similar word extraction unit
102 conversion table generation unit
200 computer
201 CPU
202 memory
203 storage device
204 I/F unit

What is claimed is:

1. A conversion table generation device comprising:
at least one memory storing instructions; and
at least one processor configured to access the at least one memory and execute the instructions to:
acquire scenario data for a voice dialog;
extract first words from the scenario data by performing morphological analysis;
extract a similar word similar to a first word for each of the first words extracted from the scenario data;
determine priority based on similarity between the first word and a vowel or a consonant of the similar word;
associate the similar word as a second word with any one of the first words based on priority the priority when the similar word is similar to a plurality of the first words;
generate a conversion table for voice recognition in the voice dialog, the conversion table having the second word as a conversion source and the first word as a conversion destination;
receive an audio file including input voice dialog;
apply a voice recognition model to the audio file to generate a text file representing a preliminary voice recognition result of the input voice dialog; and
apply a conversion process to the generated text file to generate an updated text file representing an updated voice recognition result of the voice dialog,
wherein application of the conversion processing comprises:
for each of a plurality of words of the generated text file, identifying whether the word is the second word in the generated conversion table; and
for each word that has been identified as being the second word in the generated conversion table, changing the word to the first word in the generated conversion table; and
for each word that has not been identified as being the second word in the generated conversion table, not changing the word,
wherein by changing each word in the generated text file that is the second word with the first, the updated voice recognition result is more accurate than the preliminary voice recognition result because the first word better corresponds to the word actually spoken in the input voice dialog than the second word does, thereby improving voice recognition technology.

2. The conversion table generation device according to claim 1, wherein
the at least one processor is further configured to execute the instructions to:
refer to a table in which characters having vowels and consonants in common are arranged in rows and columns; and
associate the similar word similar to the plurality of first words with the first word having a matching row or column.

3. The conversion table generation device according to claim 1, wherein
the at least one processor is further configured to execute the instructions to:
acquire a log of an operation of replacing and correcting the first word included in a result of voice recognition with the second word using the conversion table; and
update the conversion table based on the log.

4. The conversion table generation device according to claim 1, wherein
the at least one processor is further configured to execute the instructions to:
acquire data including a word group used in a dialog;
extract a word from data including a word group used in the dialog; and
extract the similar word for each extracted word.

5. A conversion table generation method performed by a computer and comprising:
extracting first words from the scenario data by performing morphological analysis;
extracting a similar word similar to a first word for each of the first words extracted from the scenario data;
determining priority based on similarity between the first word and a vowel or a consonant of the similar word;
associating the similar word as a second word with any one of the first words based on priority the priority when the similar word is similar to a plurality of the first words;
generating a conversion table for voice recognition in the voice dialog, the conversion table having the second word as a conversion source and the first word as a conversion destination;
receiving an audio file including input voice dialog;
applying a voice recognition model to the audio file to generate a text file representing a preliminary voice recognition result of the input voice dialog; and
applying a conversion process to the generated text file to generate an updated text file representing an updated voice recognition result of the voice dialog,
wherein application of the conversion processing comprises:
for each of a plurality of words of the generated text file, identifying whether the word is the second word in the generated conversion table; and
for each word that has been identified as being the second word in the generated conversion table, changing the word to the first word in the generated conversion table; and
for each word that has not been identified as being the second word in the generated conversion table, not changing the word,
wherein by changing each word in the generated text file that is the second word with the first, the updated voice recognition result is more accurate than the preliminary voice recognition result because the first word better corresponds to the word actually spoken in the input voice dialog than the second word does, thereby improving voice recognition technology.

6. The conversion table generation method according to claim 5, wherein the conversion table generation method refers to a table in which characters having vowels and consonants in common are arranged in rows and columns, and associates the similar word similar to the plurality of first words with the first word having a matching row or column.

7. The conversion table generation method according to claim 5, comprising:
acquiring a log of an operation of replacing and correcting the first word included in a result of voice recognition with the second word using the conversion table; and
updating the conversion table based on the log.

8. The conversion table generation method according to claim 5, further comprising:
acquiring data including a word group used in a dialog;
extracting a word from data including a word group used in the dialog; and
extracting the similar word for each extracted word.

9. A non-transitory recording medium storing a computer program executable by a computer to perform processing comprising:
- extracting first words from the scenario data by performing morphological analysis;
- extracting a similar word similar to a first word for each of the first words extracted from the scenario data;
- determining priority based on similarity between the first word and a vowel or a consonant of the similar word;
- associating the similar word as a second word with any one of the first words based on priority the priority when the similar word is similar to a plurality of the first words;
- generating a conversion table for voice recognition in the voice dialog, the conversion table having the second word as a conversion source and the first word as a conversion destination;
- receiving an audio file including input voice dialog;
- applying a voice recognition model to the audio file to generate a text file representing a preliminary voice recognition result of the input voice dialog; and
- applying a conversion process to the generated text file to generate an updated text file representing an updated voice recognition result of the voice dialog,
- wherein application of the conversion processing comprises:
  - for each of a plurality of words of the generated text file, identifying whether the word is the second word in the generated conversion table; and
  - for each word that has been identified as being the second word in the generated conversion table, changing the word to the first word in the generated conversion table; and
  - for each word that has not been identified as being the second word in the generated conversion table, not changing the word,
- wherein by changing each word in the generated text file that is the second word with the first, the updated voice recognition result is more accurate than the preliminary voice recognition result because the first word better corresponds to the word actually spoken in the input voice dialog than the second word does, thereby improving voice recognition technology.

* * * * *